(12) United States Patent
Tomala et al.

(10) Patent No.: US 9,119,106 B2
(45) Date of Patent: Aug. 25, 2015

(54) MINIMIZING DRIVE TESTS MEASUREMENTS CONFIGURATION FOR SIGNAL STRENGTH REPORTING IN MOBILE COMMUNICATIONS ENVIRONMENTS

(75) Inventors: Malgorzata Tomala, Nowe Miasto nad Pilica (PL); Yi Zhang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 109 days.

(21) Appl. No.: 13/981,928

(22) PCT Filed: Feb. 21, 2011

(86) PCT No.: PCT/EP2011/052485
§ 371 (c)(1),
(2), (4) Date: Jul. 26, 2013

(87) PCT Pub. No.: WO2012/113435
PCT Pub. Date: Aug. 30, 2012

(65) Prior Publication Data
US 2013/0308489 A1  Nov. 21, 2013

(51) Int. Cl.
*H04Q 7/00* (2006.01)
*H04W 24/10* (2009.01)
*H04W 24/08* (2009.01)

(52) U.S. Cl.
CPC ............. *H04W 24/10* (2013.01); *H04W 24/08* (2013.01)

(58) Field of Classification Search
None
See application file for complete search history.

(56) References Cited

U.S. PATENT DOCUMENTS

| 8,798,658 B2 * | 8/2014 | Persson et al. ................ 455/517 |
| 2007/0149129 A1 | 6/2007 | Das et al. ................... 455/67.11 |
| 2013/0188510 A1 * | 7/2013 | Siomina et al. ............... 370/252 |

FOREIGN PATENT DOCUMENTS

| CN | 1956594 A | 5/2007 |
| WO | WO2008/018039 A2 | 2/2008 |

OTHER PUBLICATIONS

3GPP TS 37.320 V10.0.0 (Dec. 2010); "3rd Generation Partnership Project; Technical Specification Croup Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)"; 17 pgs.

3GPP TS 36A33 V10.1.0 (Dec. 2010); "3rd Generation Partnership Project; Technical Specification Group Radio Access Network; Evolved Universal Terrestrial Radio Access (E-UTRA); Requirements for support of radio resource management (Release 10)"; 402 pgs.

* cited by examiner

*Primary Examiner* — Duc C Ho
(74) *Attorney, Agent, or Firm* — Harrington & Smith

(57) ABSTRACT

At least one table for mapping measured quantity values of a signal strength, which are measured by a user equipment according to a minimizing drive tests policy in a mobile communications environment, to reported values is generated by including a number n of thresholds therein which are adjustable and indicate signal strength ranges defining the reported values, wherein n is greater or equal to two. The number n and values of the thresholds are adjusted to filter the measured quantity values in the user equipment, and the minimizing drive tests policy is controlled based on the at least one table.

19 Claims, 5 Drawing Sheets

Prior Art

Fig. 1A

| Reported value | Measured quantity value | Unit |
|---|---|---|
| RSRP_00 | RSRP < -140 | dBm |
| RSRP_01 | -140 ≤ RSRP < -139 | dBm |
| RSRP_02 | -139 ≤ RSRP < -138 | dBm |
| ... | ... | ... |
| RSRP_95 | -46 ≤ RSRP < -45 | dBm |
| RSRP_96 | -45 ≤ RSRP < -44 | dBm |
| RSRP_97 | -44 ≤ RSRP | dBm |

Prior Art

Fig. 1B

| Reported value | Measured quantity value | Unit |
|---|---|---|
| RSRQ_00 | RSRQ < -19.5 | dB |
| RSRQ_01 | -19.5 ≤ RSRQ < -19 | dB |
| RSRQ_02 | -19 ≤ RSRQ < -18.5 | dB |
| ... | ... | ... |
| RSRQ_32 | -4 ≤ RSRQ < -3.5 | dB |
| RSRQ_33 | -3.5 ≤ RSRQ < -3 | dB |
| RSRQ_34 | -3 ≤ RSRQ | dB |

Fig. 4A

| Reported value | Measured quantity value | Unit |
|---|---|---|
| RSRP_00 | RSRP < -140 | dBm |
| RSRP_01 | -140 ≤ RSRP < -110 | dBm |
| RSRP_02 | -110 ≤ RSRP < -107 | dBm |
| RSRP_03 | -107 ≤ RSRP < -105 | dBm |
| RSRP_04 | -105 ≤ RSRP < -100 | dBm |
| RSRP_05 | -100 ≤ RSRP < -90 | dBm |
| RSRP_06 | -90 ≤ RSRP < -44 | dBm |
| RSRP_07 | -44 ≤ RSRP < -40 | dBm |

Fig. 4B

| Reported value | Measured quantity value | Unit |
|---|---|---|
| RSRP_00 | RSRP < -140 | dBm |
| RSRP_01 | -110 ≤ RSRP < -100 | dBm |
| RSRP_02 | -80 ≤ RSRP | dBm |

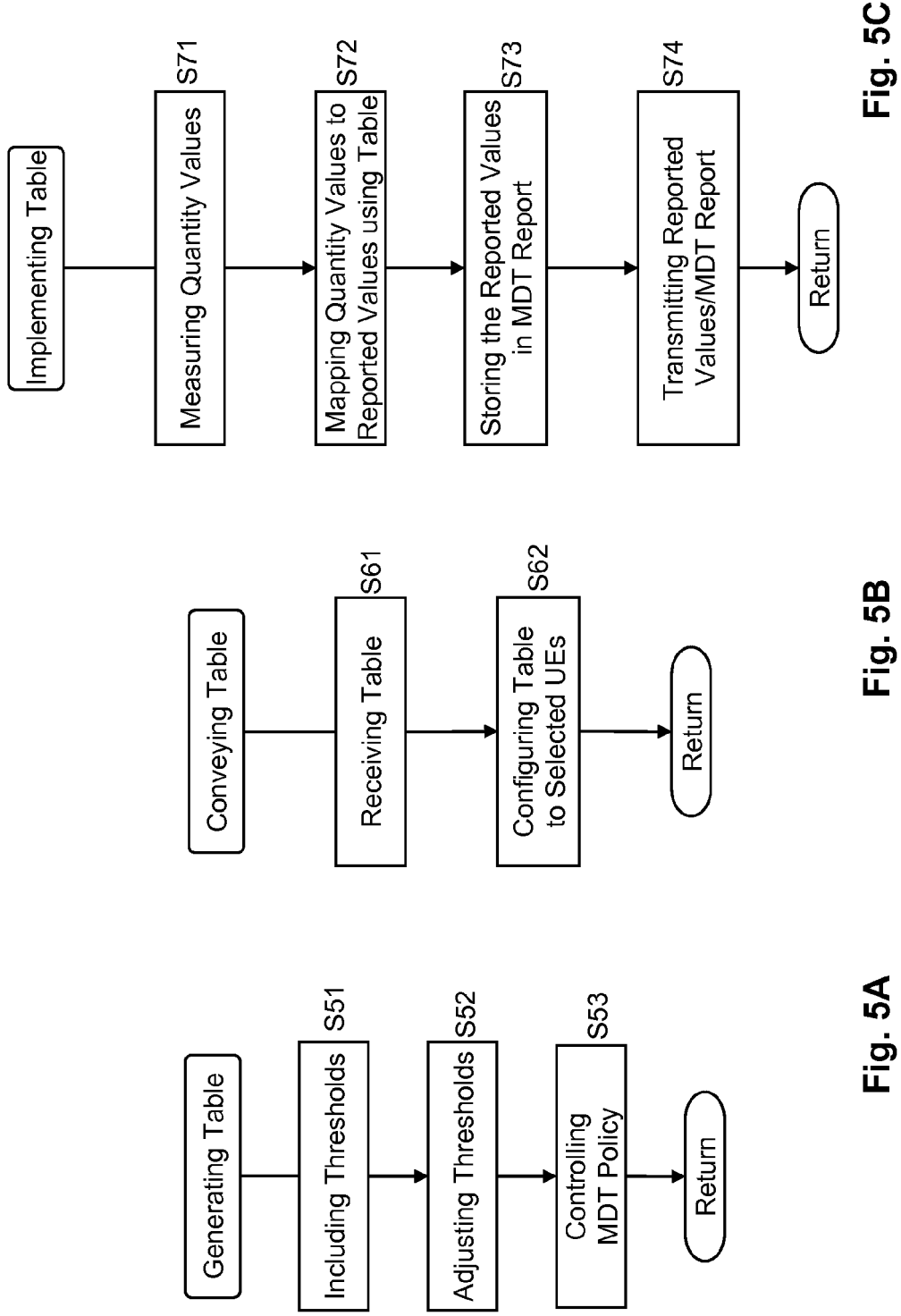

MINIMIZING DRIVE TESTS MEASUREMENTS CONFIGURATION FOR SIGNAL STRENGTH REPORTING IN MOBILE COMMUNICATIONS ENVIRONMENTS

The present invention relates to MDT (minimizing drive tests) measurements configuration for signal strength reporting in mobile communications environments. Signal strength reporting may comprise reference signal received power/reference signal received quality (RSRP/RSRQ) reporting.

The mobile communications environments may comprise systems such as LTE (long term evolution) and UMTS (universal mobile telecommunications system) that enable an MDT concept.

The MDT concept aims at defining an automatic collection of UE (user equipment) measurements, to enable easier monitoring of mobile communications network performance and consequently to replace expensive drive-tests performed by operators manually. Currently, there are two MDT reporting approaches. One is immediate MDT reporting and another is logged MDT reporting. In the latter case, the configuration is done when the UE is in connected mode and MDT data collection is done at the UE side when the UE is in idle mode. The measurements for the logged MDT reporting follow a known general measurement mechanism in which the UE only performs serving cell measurements if a serving cell signal is good enough, and otherwise the UE performs intra/inter-frequency and inter-RAT (radio access technology) measurements that are given in system information.

Following the general measurement mechanism in idle mode, the UE always measures RSRP/RSRQ with certain accuracy and granularity every DRX (discontinuous reception) cycle for serving cell evaluation purposes. The UE that is logged MDT reporting capable measures RSRP/RSRQ in idle mode and in addition maps it to a reported (logged) value. In each MDT logging interval, the UE records the reported value into an MDT report.

FIGS. 1A and 1B show tables for mapping measured quantity values of a signal strength, e.g. measured quantity values of RSRP and RSRQ, measured by the UE in idle mode according to logged MDT reporting, to reported values RSRP_00, RSRP_01, . . . RSRP_97 and RSRQ_00, RSRQ_01, . . . RSRQ_34. For example, referring to FIG. 1A, in case a measured quantity value of RSRP is below −140 dBm, a reported value RSRP_00 is recorded in the MDT report. Referring to FIG. 1B, in case a measured quantity value of RSRQ is greater or equal to −19.5 dBm and smaller than −19 dBm, a reported value RSRQ_01 is recorded in the MDT report.

As shown in FIGS. 1A and 1B, the signal strength ranges defining the reported values are continuous and equal between −140 dBm and −44 dBm and −19.5 dBm and −3 dBm, respectively.

The general measurement mechanism in idle mode mandates serving cell measurements performance every DRX cycle. Moreover, in case a serving cell signal becomes significantly weak, the UE has to measure intra-frequency and inter-frequency/RAT neighbors indicated in the system information in order to choose a new serving cell.

The logged MDT reporting in idle mode supports periodical logging only. Since the logged MDT reporting respects all the above measurement rules and requirements, it makes use of the available measurements without the possibility to control what is actually recorded. This means logged MDT reports will contain mainly periodical measurements of the serving cell of the UE, and sporadically measurements of neighboring cells will be included in the logged MDT report when the UE performs neighboring cell measurements when a logging interval expires and the point of measurement recording occurs.

According to the current logged MDT reporting, periodical logging is performed continuously when the UE is in the idle mode. If a UE stays in the center of a cell most of the time, the UE may always log the same "good" measurements on the serving cell, which may not bring much benefit to operators, because from network optimization point of view, in most cases measurements on a "bad" situation are more valuable than those on a "good" situation. In addition, such logging campaign performed by one particular UE will result in an excessive amount of data containing the same results, without much variety and value or even with some redundancy. Consequently, this may produce some inefficient results. For example, logged data may unnecessarily impact the UE memory and battery, while a radio access network (RAN) has no way to control the measurement logging to get desired results and the UE's behavior to save the UE's battery and memory.

In an effort to filter out measurements that may not be in operators' interest it has been proposed to use an A2 event trigger "Serving cell becomes less than threshold" which is available for immediate MDT reporting which is real time reporting in connected UE mode for logged MDT reporting in idle mode. In this case the UE only records the measurements when the signal strength from the serving cell becomes less than the threshold and avoids recording the "good" measurement results. The threshold may be configured by the system information or using RRC (radio resource control) signaling.

Although this solution allows avoiding recording of the "good" measurements by the UE, it can only provide ON or OFF functionality to the serving cell measurements.

This kind of solution typically involves all the UEs at cell edge as shown in FIG. 2A which illustrates a situation in which a logging area (i.e. an area in which the UE records MDT measurements) is determined by an event "serving cell becomes less than threshold". All the UEs which reside in the area where the condition "serving cell becomes less than threshold" is continuously fulfilled, have to perform logging all the time. Thus, for these UEs the A2 event trigger does not bring much remedy to UE battery and memory compared to continuous periodical logging.

By configuring multiple instances of event A2, with respective threshold settings (RSRP1<=Threshold1, RSRP2<=Threshold2), it is possible to get MDT reports according to a desired RSRP/RSRQ grid. In order to collect power/quality information according to a predefined grid, multiple instances of such events may be configured with appropriate conversion of respective measurements.

However, logged MDT reporting in idle mode differs from immediate MDT and real time reporting, which is more flexible in terms of configuration. If a logging threshold is configured by a logging measurement configuration message (e.g. following a method with RRC signaling on configuring an A2 event trigger for immediate MDT reporting), there will be no possibility to mandate the UE to maintain multiple instances of event A2. Only a "single threshold based solution", i.e. RSRP<=Threshold, can be supported, as the UE in idle mode maintains a single MDT context which was received in the single logging measurement configuration message. Any new attempt to change a Logged MDT configuration will result in the previous settings release. In other words, the configuration previously received will be overwritten.

Hence, with the above proposal only "the logging area margin" can be controlled, i.e. more or less UEs can be involved in the measurements logging as shown in FIG. 2B which illustrates a situation in with the logging area is determined by the A2 event trigger "serving cell becomes less than threshold" with different threshold values.

Thus, considering filtering measurements in the UE, the threshold is helpful only for the UEs in the center of the cell. With regard to amount of data obtained at the network from one cell, this filtering in fact results in lower overload, but is also not very effective as always leads to information loss from the center of the cell.

The present invention aims at providing a more flexible solution for restricting reported values of UEs in MDT policy, but is not limited thereto.

Moreover, UE memory and battery should be saved when the UE performs the MDT policy, and reported values or MDT reports should be restricted to cell areas the operator is interested in.

This can be achieved by the exemplary methods and apparatuses as defined in the appended claim. According to an embodiment, the invention may be implemented by a computer program product.

According to an embodiment of the invention, RSRP/RSRQ reporting can be configured. Operator configurable minimization drive test (MDT) measurement mapping tables are introduced, which may have an unequal size of intervals to reduce an amount of measurements or memory, for RSRP/RSRQ reporting for devices supporting the MDT policy. The reporting can be done based on operators' needs and only on those signal strengths that are interesting for them.

The reporting for MDT is performed according to signaled new RSRP/RSRQ tables, i.e. dedicated mapping is introduced. With these tables the MDT policy can be controlled in an efficient way.

According to an embodiment of the invention, the overhead of the MDT reporting is reduced and the log size, i.e. the size of the MDT report can be limited. Consequently, also a UE involvement can be reduced by enabling more effective data collection in which the operator can specify in an efficient way to get the most interesting measurements from a measurement range/value perspective.

According to an embodiment of the invention, a more flexible solution is provided to restrict the UE MDT reports only to an operator's selected range of values and to avoid a continuous report of the same values when a UE stays at the same position.

Compared to the A2 event trigger configuration, the present invention enables configuring multiple instances of predefined thresholds for a serving cell that trigger logging and/or transmittal of reported values.

In the following the present invention will be described by way of embodiments thereof taking into account the accompanying drawings, in which:

FIGS. 1A and 1B show RSRP and RSRQ measurement report mapping tables according to the prior art.

FIGS. 4A and 4B show RSRP measurement report mapping tables according to an embodiment of the present invention.

FIG. 5A shows a flow chart illustrating a table generation procedure according to an embodiment of the invention, FIG. 5B shows a flow chart illustrating a table conveying procedure according to an embodiment of the invention, and FIG. 5C shows a flow chart illustrating a table implementation procedure according to an embodiment of the invention.

Figure 2A:
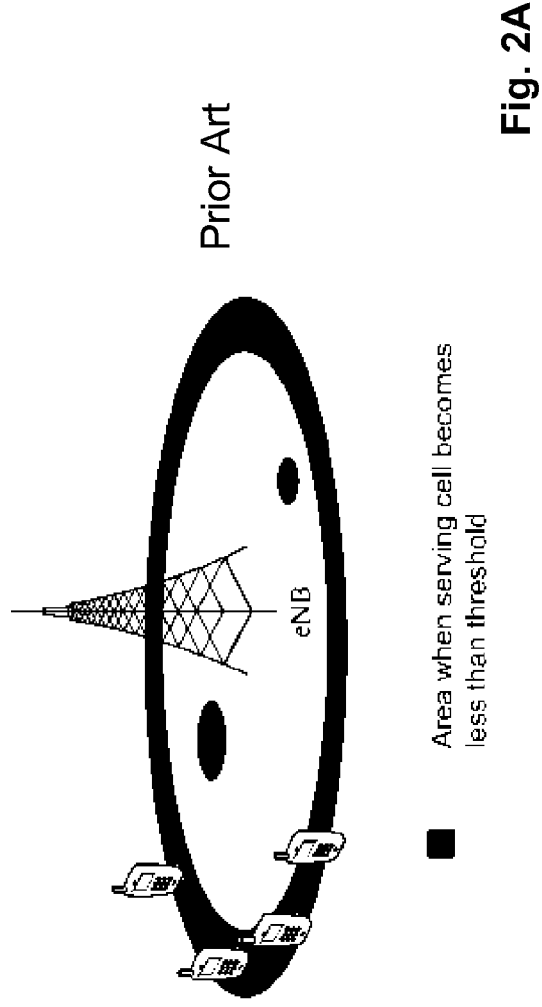
FIGS. 2A and 2B show diagrams illustrating a logging area determined by A2 event triggers according to the prior art.
Figure 2B:
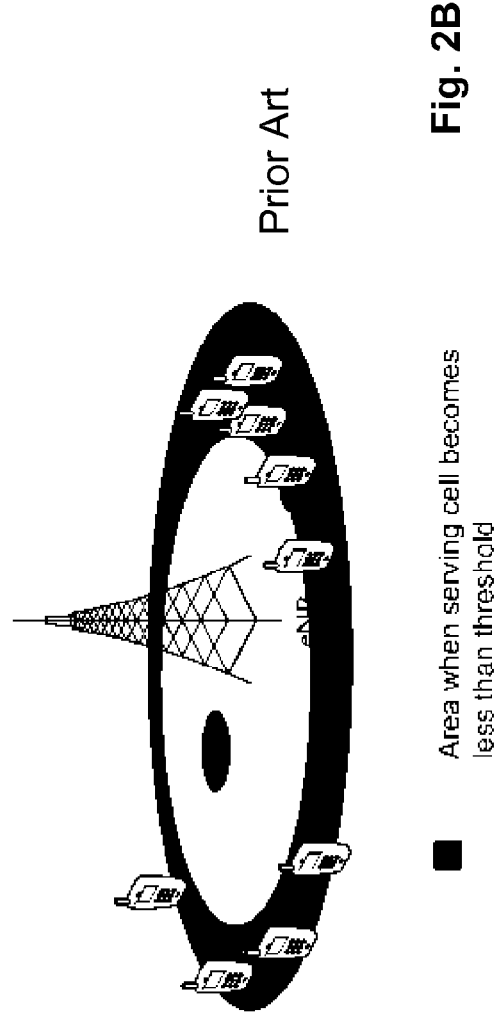
Figure 3:
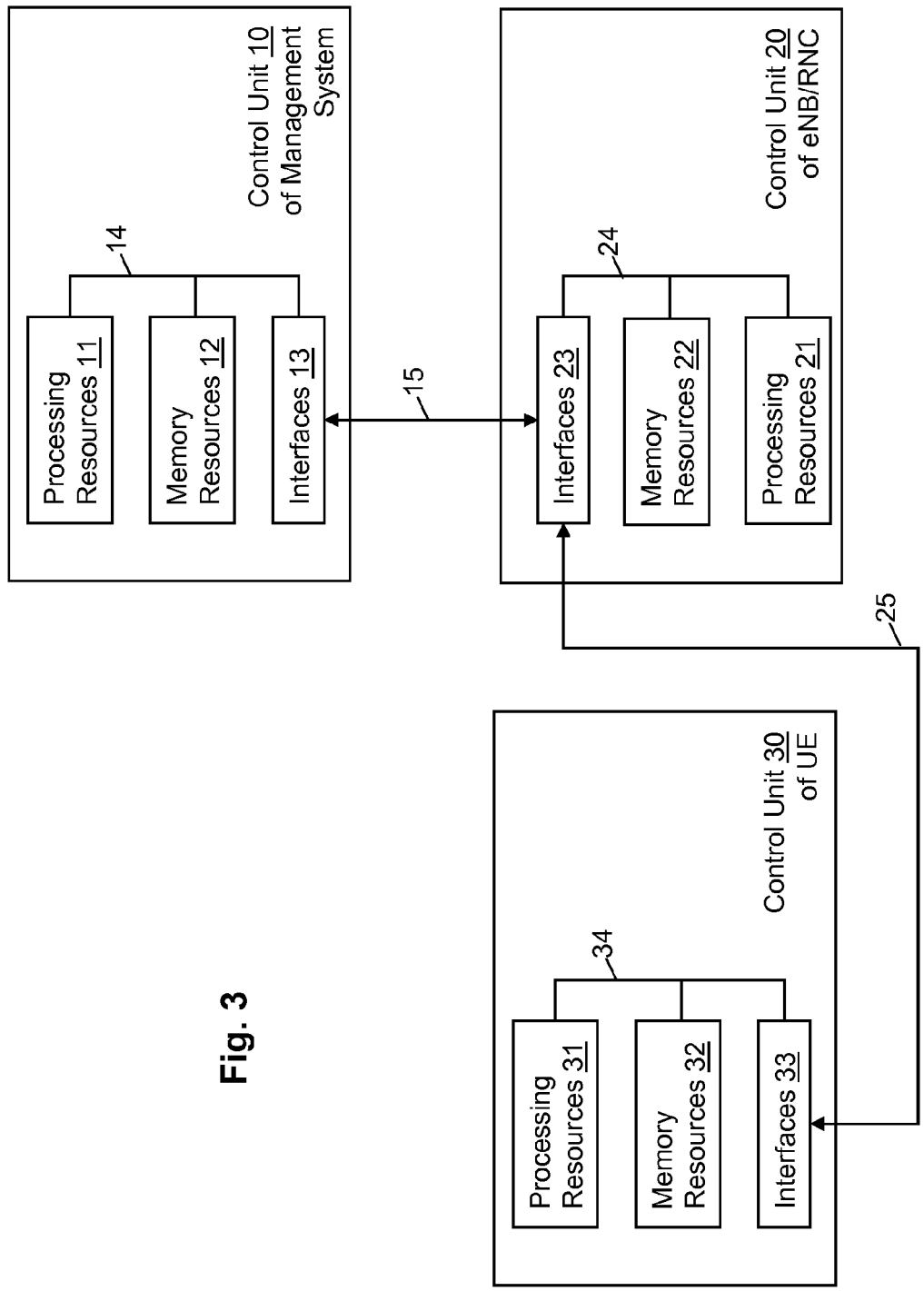
FIG. 3 shows a schematic block diagram illustrating structures of devices involved in the logged MDT measurements configuration according to an embodiment of the present invention.

As a preliminary matter before exploring details of various implementations, reference is made to FIG. 3 for illustrating a simplified block diagram of various electronic devices that are suitable for use in practicing the exemplary embodiments of this invention.

A control unit 10 of a management system which forms part of a mobile communications network system such as LTE and UMTS, for example, comprises processing resources 11, memory resources 12 and interfaces 13 which may be coupled by one or several links 14.

A control unit 20 of an eNB/RNC (evolved node B, radio network controller) which forms part of a radio access network of the mobile communications network system comprises processing resources 21, memory resources 22 and interfaces 23 which may be coupled by one or several links 24.

A control unit 30 of a UE (user equipment) comprises processing resources 31, memory resources 32 and interfaces 33 which may be coupled by one or several links 34.

The memory resources 12, 22 and 32 may store programs which may serve to implement embodiments of the present invention. At least the interfaces 23 and 33 may include a suitable radio frequency (RF) transceiver coupled to one or more antennas (not shown) for bidirectional wireless communications over one or more wireless links 25 between the eNB/RNC and the UE. The control unit 10 and the control unit 20 may be connected by a link 15 via the interfaces 13 and 23.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least one of the memory resources 12, 22, 32 is assumed to store a program which includes program instructions that, when executed by the associated processing resources, enable the electronic device to operate in accordance with the exemplary embodiments of this invention, as detailed below. Inherent in the processing resources 11, 21, 31 is a clock to enable synchronism among the various apparatus for transmissions and receptions within the appropriate time intervals and slots required, as the scheduling grants and the granted resources/subframes are time dependent. The transceivers included at least in the interfaces 23 and 33 include both transmitter and receiver, and inherent in each is a modulator/demodulator commonly known as a modem. The control units 10 and 20 also are assumed to each include a modem e.g. provided in the interfaces, to facilitate communication over the (hardwire) link 15 between the eNB/RNC and the management system.

In general, the exemplary embodiments of this invention may be implemented by computer software respectively stored in the memory resources 12, 22, 32 and executable by the associated processing resources 11, 21, 31, or by hardware, or by a combination of software and/or firmware and hardware in any or all of the devices shown.

In general, the various embodiments of the UE can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memory resources 12, 22, 32 may be of any type suitable to the local technical environment and may be implemented using any suitable data storage technology, such as semiconductor-based memory devices, magnetic memory devices and systems, optical memory devices and systems, fixed memory and removable memory. The processing resources 11, 21, 31 may be of any type suitable to the local technical environment, and may include one or more of general purpose computers, special purpose computers, microprocessors, digital signal processors (DSPs) and processors based on a multi-core processor architecture, as non-limiting examples.

According to an embodiment of the invention, the management system configures, by means of the control unit 10, at least one table for mapping measured quantity values of a signal strength, which are measured by a UE according to an MDT policy, e.g. measured RSRP and RSRQ values, to reported values which then may be transmitted by the user equipment. Alternatively, the reported values may be stored by the user equipment in an MDT report according to a logged minimizing drive tests policy.

The management system may configure different mapping tables for the measurement results in order to define how the measurement results will be reported and/or stored in the MDT report and to modify the granularity for better supporting MDT data collection.

For example, RSRP and RSRQ measurement report mapping tables for MDT purposes as shown in FIGS. 4A and 4B are configured, where FIGS. 4A and 4B only show tables for RSRP as an example. The management system can define new RSRP and RSRQ measurement report mapping tables for MDT based on actual operators' requirements.

The granularity of each reported value can be adjusted by the management system, i.e. if more detailed information on one special RSRP range is desired, e.g. on a signal strength range [−110 dBm, −100 dBm], small granularity is introduced compared to other reported values. Referring to the table shown in FIG. 4A, the signal strength range [−110 dBm, −100 dBm] is divided in ranges [−110 dBm, −107 dBm[, [−107 dBm, −105 dBm[ and [−105 dBm, −100 dBm[ which define reported values RSRP_02, RSRP_03 and RSRP_04. The ranges are indicated by thresholds −110 dBm, −107 dBm, −105 dBm and −100 dBm in this example.

On the contrary, if some particular RSRP range is not of interest, e.g. a signal strength range of [−80 dBm, −40 dBM], then a large granularity is introduced. Referring to the table shown in FIG. 4A, this signal strength range is divided in ranges [−90 dBm, −44 dBm] and [−44 dBm, −40 dBM] which are indicated by thresholds −90 dBm and −44 dBm and define reported values RSRP_06 and RSRP_07.

FIG. 4B shows an RSRP measurement report mapping table for MDT with different granularity and measured quantity value accuracy. This table is configured with a discontinuous reporting range. That is, a reported value RSRP_00 is logged (i.e. stored in the MDT report) when a UE which has configured the table shown in FIG. 4B, by means of its control unit 30 measures an RSRP quantity value smaller than a first threshold of −140 dBm, a reported value RSRP_01 is logged when the UE measures an RSRP quantity value equal to or greater than a second threshold of −110 dBm and smaller than a third threshold of −100 dBm, and a reported value RSRP_02 is logged when the UE measure an RSRP quantity value equal to or greater than a fourth threshold of −80 dBm in the MDT policy.

Referring to FIG. 5A, according to an embodiment of the invention, at least one table for mapping measured quantity values of a signal strength to reported values is generated by the management system e.g. by means of the control unit 10, by including a number n of thresholds therein (step S51) which are adjustable and indicate signal strength ranges defining the reported values, wherein n is greater or equal to two. The number n and values of the thresholds are adjusted (step S52) to filter the measured quantity values in the user equipment. The MDT policy is controlled (step S53) by the management system e.g. by means of the control unit 10 based on the at least one table.

The measured quantity values may comprise RSRP values and/or RSRQ values, and the signal strengths ranges may comprise RSRP and/or RSRQ ranges.

A measurement report mapping table configured as described above can be applied to all frequencies of all RATs, or can be only configured to some special frequencies.

The control unit 10 may configure an RSRP/RSRQ measurement report mapping table for MDT measurement via a trace operation. That is, the management system may activate a trace and/or a trace job for automatic terminal measurements with the configuration of the RSRP and/or RSRQ measurement report mapping table. An indication based on the trace operation is sent from the management system to the eNB/RNC. In this regard, the RSRP/RSRQ measurement report mapping table configuration may be indicated in a predetermined trace attribute and/or message for automatic UE measurements.

The control unit 10 may configure the at least one measurement report mapping table by using its processing resources 11, memory resources 12 and interfaces 13. Via the interfaces 13 the control unit 10 may forward the at least one table (measurement report mapping table) to eNBs/RNCs of the mobile communications network system. FIG. 3 shows control unit 20 of such eNB/RNC which may receive the table through the link 15 via its interfaces 23. Referring to FIG. 5B, the table is received by the eNB/RNC in step S61.

Referring to FIG. 5B, the eNB/RNC, e.g. by means of its control unit 20, can configure (step S62) the received table to selected UEs e.g. during an established connection between the selected UEs and the radio access network. The UEs are selected depending on the trace functionality for MDT: for an area based MDT data collection a cell traffic trace functionality can be used, and for a subscription based MDT data collection or for subscriber complaint an IMSI/IMEI (international mobile subscriber identity/international mobile equipment identity) trace functionality can be utilized.

In the first case, the management system sends the configuration for MDT to the eNB/RNC, and then the eNB/RNC can select the UEs based on the configuration from management system and other factors according to implementation issues. In the second case, the management system has selected the UEs and informs the eNB/RNC about the UEs' IMSI/IMEI, and then the eNB/RNC can select the related UEs.

The control unit 20 may receive and forward the table by using its interfaces 23, processing resources 21 and memory resources 22. The table may be configured to the UE shown in FIG. 3 as one of the selected UEs over the link 25.

Alternatively, the table may be provided to the selected UEs beforehand for the MDT policy.

Referring to FIG. 5C, the UE, e.g. by means of its control unit 30, measures quantity values of a signal strength according to the MDT policy in step S71. Using the at least one table, which the UE may have received from the control unit 20, it maps the measured quantity values to reported values in step S72 and transmits the reported values e.g. to the eNB/RNC in step S74. Alternatively, the UE may store the reported values in an MDT report in step S73 and, in step S74, transmit the MDT report e.g. to the eNB/RNC.

The control unit 30 may receive the table over the link 25 via its interfaces 33 and perform the MDT policy using the table by using its processing resources 31 and memory resources 32. It may transmit the reported values or the MDT report via its interfaces 33 over the link 25.

As all MDT reports may be tagged with position of the UEs performing the MDT policy, the reported values can be combined with location information. Thus, a relatively detailed statistical distribution of RSRP/RSRQ can be obtained.

It is to be noted that the above-described approach is applicable to logged and immediate MDT policies.

With the above-described approach a UE can be configured to log measurements in MDT policy according to a power/quality grid.

The above-described approach addresses the issue of periodical reporting, which yields massive data from UEs that are not important to be monitored, and the issue of power consumption/battery saving for UEs due to the fact that they are continuously reporting.

By configuring logging/reporting according to a table with an adjustable range of values, such as shown in FIGS. 4A and 4B, when a measured quantity value is identical to one of the entries in the table, a UE performing MDT policy logs a reported value and may set up the report. Thus, no longer-term periodic reporting and even no logging of UEs occurs that receive a power higher than the last entry of the table.

Further, according to an embodiment of the invention a solution to the power consumption issue can be achieved by a table defined with less granularity, e.g. the table shown in FIG. 4B, with discontinuous ranges and, hence, specifying when measurement logging should take place and when not in a selective manner. This allows to avoid a continuous report of the same values when a UE stays at the same position.

By configuring logging with a continuous reporting range as shown in FIG. 4A a possible gain is to obtain an RSRP distribution with the desired granularity, for instance coverage maps with interests in particular RSRP ranges. So with the table shown in FIG. 4A reporting results are presenting a desired distribution.

The above-described approach does not mandate to violate logged MDT reporting rules for UE measurement principles in idle mode. Rather, granularity of the stored measurements/reports is more flexible and may be maintained in accordance with the existing performance requirements. A UE which measures a serving cell according to the idle mode principles, for MDT purposes checks measurement report mapping table before logging in order to evaluate whether the measured quantity value is in interest of the predefined logging or not. No new and additional measurements requirements or granularity thereof means that the UE does not have to measure any other cells than the serving cell if the signal level is good enough e.g. according to known S-criteria for intra & inter frequency measurements.

However, depending on terminal vendors implementation and flexibility the above-described approach also works if performance requirements can be extended and/or influenced by the tables' configuration.

It is to be noted that the RSRP/RSRQ measurement report mapping tables may be fixed in the UE. That is, there is no need to configure the tables through air interface, as UE vendors have fixed the tables for MDT policy.

According to an aspect of the invention, an apparatus of a management system is provided which comprises generating means for generating at least one table for mapping measured quantity values of a signal strength, which are measured by a user equipment according to a minimizing drive tests policy in a mobile communications environment, to reported values, wherein the generating means comprises including means for including a number n of thresholds in the at least one table, which are adjustable and indicate signal strength ranges defining the reported values, wherein n is greater or equal to two, adjusting means for adjusting the number n and values of the thresholds to filter the measured quantity values in the user equipment, and controlling means for controlling the minimizing drive tests policy based on the at least one table.

The measured quantity values may comprise reference signal received power values and/or reference signal received quality values, and the signal strengths ranges may comprise reference signal received power/reference signal received quality ranges.

The minimizing drive tests policy may comprise a logged minimizing drive tests policy in which the reported values are stored by the user equipment in a minimizing drive tests report.

The generating means may generate the at least one table for predetermined frequencies of a radio access technology via which the user equipment accesses a mobile communications network of the mobile communications environment.

The apparatus may comprise setting means for setting the number n and the values of the thresholds in accordance with a desired granularity of the reported values.

The adjusting means may adjust the thresholds to indicate unequal and/or discontinuous signal strength ranges.

For example, the above means of the apparatus are implemented by the processing resources 11, memory resources 12 and interfaces 13 of the control unit 10 of FIG. 3 as described above.

According to an aspect of the invention, an apparatus of an eNB/RNC is provided, which comprises receiving means for receiving the at least one table and configuring means for configuring the at least one table to selected user equipments during an established connection between the selected user equipments and the mobile communications network of the mobile communications environment.

For example, the above means of the apparatus are implemented by the processing resources 21, memory resources 22 and interfaces 23 of the control unit 20 of FIG. 3 as described above.

According to an aspect of the invention, an apparatus of a user equipment is provided, which comprises measuring means for measuring quantity values of a signal strength according to the minimizing drive tests policy in the mobile communications environment, mapping means for mapping, using the at least one table, the measured quantity values to reported values, and transmitting means for transmitting the reported values.

The apparatus may further comprise storing means for storing the reported values in a minimizing drive tests report, and transmitting means for transmitting the reported values in the minimizing drive tests report.

For example, the above means of the apparatus are implemented by the processing resources 31, memory resources 32 and interfaces 33 of the control unit 30 of FIG. 3 as described above.

According to an embodiment of the invention, at least one table for mapping measured quantity values of a signal strength, which are measured by a user equipment according to a minimizing drive tests policy in a mobile communications environment, to reported values is generated by including a number n of thresholds therein which are adjustable and indicate signal strength ranges defining the reported values, wherein n is greater or equal to two. The number n and values of the thresholds are adjusted to filter the measured quantity values in the user equipment, and the minimizing drive tests policy is controlled based on the at least one table.

It is to be understood that the above description is illustrative of the invention and exemplifies the invention, and is not to be construed as limiting the invention. Various modifications and applications may occur to those skilled in the art without departing from the true spirit and scope of the invention as defined by the appended claims.

The invention claimed is:

1. A method comprising:
generating at least one table for mapping measured quantity values of a signal strength to reported values, said quantity values being measured by a user equipment according to a minimizing drive tests policy in a mobile communications environment, wherein the at least one table is generated by including a number n of thresholds therein, said thresholds being adjustable and indicating signal strength ranges defining the reported values, said thresholds further being selected to define signal strength ranges of at least one of unequal and discontinuous extent, wherein n is greater or equal to two, and wherein the number n and values of the thresholds are adjusted to filter the measured quantity values in the user equipment; and
controlling the minimizing drive tests policy based on the at least one table.

2. The method of claim 1, wherein the measured quantity values comprise reference signal received power values and/or reference signal received quality values, and the signal strengths ranges comprise reference signal received power/reference signal received quality ranges.

3. The method of claim 1, wherein the minimizing drive tests policy comprises a logged minimizing drive tests policy in which the reported values are stored by the user equipment in a minimizing drive tests report.

4. The method of claim 1, wherein the at least one table is generated for predetermined frequencies of a radio access technology via which the user equipment accesses a mobile communications network of the mobile communications environment.

5. The method of claim 1, wherein the number n and the values of the thresholds are set in accordance with a desired granularity of the reported values.

6. A method comprising:
receiving at least one table for mapping measured quantity values of a signal strength to reported values, said quantity values being measured by user equipments according to a minimizing drive tests policy in a mobile communications environment, wherein the at least one table includes a number n of thresholds, said thresholds indicating signal strength ranges defining the reported values, said thresholds further being selected to define signal strength ranges of at least one of unequal and discontinuous extent, wherein n is greater or equal to two, and wherein by the number n and values of the thresholds the measured quantity values in the user equipments are filtered; and
configuring the at least one table to selected user equipments during an established connection between the selected user equipments and a mobile communications network of the mobile communications environment.

7. A method comprising:
measuring quantity values of a signal strength according to a minimizing drive tests policy in a mobile communications environment;
mapping, using at least one table, the measured quantity values to reported values,
wherein the at least one table includes a number n of thresholds, said thresholds indicating signal strength ranges defining the reported values, said thresholds further being selected to define signal strength ranges of at least one of unequal and discontinuous extent, wherein n is greater or equal to two, and wherein the number n and values of the thresholds filter the measured quantity values; and
transmitting the reported values.

8. The method of claim 7, further comprising:
storing the reported values in a minimizing drive tests report; and
transmitting the reported values in the minimizing drive tests report.

9. An apparatus comprising:
at least one processor; and
at least one memory including computer program code, the at least one memory and the computer program code configured, with the at least one processor, to cause the apparatus to perform the following:
generate at least one table for mapping measured quantity values of a signal strength to reported values, said quantity values being measured by a user equipment according to a minimizing drive tests policy in a mobile communications environment, wherein the at least one table is generated by including a number n of thresholds therein, said thresholds being adjustable and indicating signal strength ranges defining the reported values, said thresholds further being selected to define signal strength ranges of at least one of unequal and discontinuous extent, wherein n is greater or equal to two, and wherein the number n and values of the thresholds are adjusted to filter the measured quantity values in the user equipment; and
control the minimizing drive tests policy based on the at least one table.

10. The apparatus of claim 9, wherein the measured quantity values comprise reference signal received power values and/or reference signal received quality values, and the signal strengths ranges comprise reference signal received power/reference signal received quality ranges.

11. The apparatus of claim 9, wherein the minimizing drive tests policy comprises a logged minimizing drive tests policy in which the reported values are stored by the user equipment in a minimizing drive tests report.

12. The apparatus of claim 9, wherein the at least one memory and the computer program code are further configured, with the at least one processor, to cause the apparatus to generate the at least one table for predetermined frequencies of a radio access technology via which the user equipment accesses a mobile communications network of the mobile communications environment.

13. The apparatus of claim 9, wherein the at least one memory and the computer program code are further configured, with the at least one processor, to cause the apparatus to set the number n and the values of the thresholds in accordance with a desired granularity of the reported values.

14. An apparatus comprising:
   at least one processor; and
   at least one memory including computer program code, the at least one memory and the computer program code configured, with the at least one processor, to cause the apparatus to perform the following:
   receive at least one table for mapping measured quantity values of a signal strength to reported values, said quantity values being measured by user equipments according to a minimizing drive tests policy in a mobile communications environment, wherein the at least one table includes a number n of thresholds, said thresholds indicating signal strength ranges defining the reported values, said thresholds further being selected to define signal strength ranges of at least one of unequal and discontinuous extent, wherein n is greater or equal to two, and wherein by the number n and values of the thresholds the measured quantity values in the user equipments are filtered; and
   configure the at least one table to selected user equipments during an established connection between the selected user equipments and a mobile communications network of the mobile communications environment.

15. An apparatus comprising:
   at least one processor; and
   at least one memory including computer program code, the at least one memory and the computer program code configured, with the at least one processor, to cause the apparatus to perform the following:
   measure quantity values of a signal strength according to a minimizing drive tests policy in a mobile communications environment;
   map, using at least one table, the measured quantity values to reported values,
   wherein the at least one table includes a number n of thresholds, said thresholds indicating signal strength ranges defining the reported values, said thresholds further being selected to define signal strength ranges of at least one of unequal and discontinuous extent, wherein n is greater or equal to two, and wherein the number n and values of the thresholds filter the measured quantity values; and
   transmit the reported values.

16. The control unit of claim 15, wherein the at least one memory and the computer program code are further configured, with the at least one processor, to cause the apparatus to:
   store the reported values in a minimizing drive tests report; and
   transmit the reported values in the minimizing drive tests report.

17. A computer program product comprising a non-transitory computer-readable storage medium bearing computer program code embodied therein for use with a processing device, the computer program code comprising code for performing the method of claim 1.

18. A computer program product comprising a non-transitory computer-readable storage medium bearing computer program code embodied therein for use with a processing device, the computer program code comprising code for performing the method of claim 6.

19. A computer program product comprising a non-transitory computer-readable storage medium bearing computer program code embodied therein for use with a processing device, the computer program code comprising code for performing the method of claim 7.

* * * * *